US007848018B2

(12) United States Patent
Nolte et al.

(10) Patent No.: US 7,848,018 B2

(45) Date of Patent: Dec. 7, 2010

(54) AUTOMATIC MICROSCOPE PROVIDED WITH AN ILLUMINATION FIELD ARRANGED IN THE APERTURE DIAPHRAGM PLANE OF A CONDENSER

(75) Inventors: Andreas Nolte, Rosdorf (DE); Lutz Höring, Oberkochen (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 257 days.

(21) Appl. No.: 11/988,649

(22) PCT Filed: Sep. 30, 2006

(86) PCT No.: PCT/EP2006/009516

§ 371 (c)(1),
(2), (4) Date: Jan. 11, 2008

(87) PCT Pub. No.: WO2007/042164

PCT Pub. Date: Apr. 19, 2007

(65) Prior Publication Data

US 2009/0034064 A1 Feb. 5, 2009

(30) Foreign Application Priority Data

Oct. 12, 2005 (DE) ...................... 10 2005 049 378

(51) Int. Cl.
*G02B 21/06* (2006.01)

(52) U.S. Cl. ..................................................... 359/389

(58) Field of Classification Search ................. 359/368, 359/369, 385, 389
See application file for complete search history.

(56) References Cited

U.S. PATENT DOCUMENTS

| | | | | |
|---|---|---|---|---|
| 4,852,985 | A | 8/1989 | Fujihara et al. | |
| 4,896,966 | A | 1/1990 | Boisseau et al. | |
| 6,369,939 | B1 | 4/2002 | Weiss et al. | |
| 6,674,575 | B1 | 1/2004 | Tandler et al. | |
| 6,713,746 | B2 | 3/2004 | Veith et al. | |
| 7,229,202 | B2 | 6/2007 | Sander | |
| 2002/0075563 | A1* | 6/2002 | Aizaki et al. | 359/363 |
| 2004/0104998 | A1 | 6/2004 | Gaida et al. | |
| 2005/0024720 | A1* | 2/2005 | Cartlidge et al. | 359/368 |
| 2005/0248839 | A1* | 11/2005 | Yamaguchi | 359/385 |
| 2006/0077541 | A1* | 4/2006 | Zahniser et al. | 359/396 |
| 2008/0316571 | A1* | 12/2008 | MacAulay | 359/239 |

FOREIGN PATENT DOCUMENTS

| | | |
|---|---|---|
| JP | 9-102899 | 4/1997 |
| JP | 10145606 A * | 5/1998 |

* cited by examiner

*Primary Examiner*—Frank G Font
(74) *Attorney, Agent, or Firm*—Walter Ottesen

(57) ABSTRACT

In an automatic microscope, there is the task to satisfy the demand for an economical, compact structure, especially a miniaturization as an essential aspect. The automatic microscope contains an optical system having the following: an illumination field (1) which is at least approximately arranged in the aperture diaphragm plane (ABE) of a condenser (2) and is used for the illumination of the object; an imaging optic (4); and, an image-providing sensor (5) arranged in the image plane of the imaging optic.

5 Claims, 2 Drawing Sheets

AUTOMATIC MICROSCOPE PROVIDED WITH AN ILLUMINATION FIELD ARRANGED IN THE APERTURE DIAPHRAGM PLANE OF A CONDENSER

RELATED APPLICATIONS

This application is the national stage of PCT/EP 2006/009516, filed Sep. 30, 2006, designating the United States and claiming priority from German patent application no. 10 2005 049 378.5, filed Oct. 12, 2005, the entire contents of which are incorporated herein by reference.

FIELD OF THE INVENTION

Automatic microscopes are used in the following areas: video microscopy, digital microscopy, for investigations of materials, inspection as well as clinical routine investigations where digital slides are generated. Furthermore, these microscopes permit an automatic scanning in of objects on object carriers and a subsequent viewing on a monitor and long-term observations in cellular biology, especially with respect to living cells.

The automatically recorded images can be viewed by an observer on-line and, if needed, with interaction or they are available at a later time point for evaluations.

Completely different requirements as to the optical design are imposed on the optical components of such automatic microscopes than in conventional microscopes having ocular object evaluation wherein ergonomic peripheral conditions are of primary importance.

BACKGROUND OF THE INVENTION

Conventional microscopes have a Köhler illumination. Up to now, mostly high pressure lamps having an electric arc and halogen lamps having spirally-wound filaments have been used. In both systems, size and configuration of the actual light source are pregiven in a narrow context. An adaptation of the light source to the dimensioning of the illuminating beam path takes place via an adaptation optic, the so-called collector.

The imaging beam path is optimized for viewing into the ocular. For this reason, when using cameras, a beam path adaptation to the field size must take place at the location of the image (chip surface of the camera) via an additional adapter.

Furthermore, the manual intervention into the microscope must be ensured and, for this purpose, the beam paths are so dimensioned that all optical components such as objectives, filters, diaphragms, et cetera can also be serviced manually. For a pregiven field size, magnification and aperture of the optic, the dimensions of the illumination and imaging optic thereby result for the systems existing up to now.

It is otherwise in automated microscopes wherein exclusively an image-providing sensor is to be optimally illuminated. The image-providing sensor is defined with respect to its dimensions by the chip diagonal. In addition, an adaptation of the optical components must take place to the specimen geometry or specimen carrier geometry and an adaptation of the resolution of the optic must take place to the resolution of the image-providing sensor with this resolution being limited by the number of pixels.

Overall, in these peripheral conditions, the requirement is for a cost-effective compact configuration with a miniaturization as an essential aspect.

SUMMARY OF THE INVENTION

It is an object of the invention to comply with this requirement.

According to the invention, the object is realized with an automatic microscope having an optical system with an illuminating field, an imaging optic and an image-providing sensor. The illuminating field is provided for object illumination and is mounted at least approximately in the aperture diaphragm plane of the condenser. The image-providing sensor is mounted in the image plane of the imaging optic.

A light-source control is provided so that the illuminating field is controlled with respect to brightness and/or color temperature. The light-source control is connected to an evaluation and control computer.

The illuminating field is preferably assembled of individual semiconductor component elements emitting at different wavelengths. The semiconductor component elements can be driven with respect to intensity individually and/or in groups of the same type whereby the adjustment of the brightness and/or color temperature of the illuminating field can take place.

Field size and magnification of the imaging optic are so adapted to the image-providing sensor that each image point, which is to be resolved, is imaged via the imaging optic onto two×two sensor pixels of the image-providing sensor.

The optical beam path of the automatic microscope is significantly simplified by the use of an illuminating field, which is positioned at or near the aperture diaphragm plane of the condenser, in lieu of a Köhler illumination and the use of an image-providing sensor which directly detects the intermediate image generated otherwise with conventional microscopes by the objective and the tubular lens. The configuration of the illuminating field can be matched optimally to the illuminating beam path. For this reason, there is no need to adjust the illumination after the exchange of the illuminating means and there is no need to adjust the adaptation of illumination via a collector.

The total system of the optical components is thereby significantly more compact than in conventional microscopes and is simpler in configuration and is more cost effective with respect to manufacture. The system can also be configured to be significantly smaller because the image field in the image plane of the imaging optic is, for example, only 11 mm in diameter for a ⅔" sensor in contrast to 25 mm for optical systems of conventional microscopes.

A folding of the optical beam paths is only necessary when it is absolutely required because of construction space requirements.

Accordingly, with the invention, a microscope concept is provided whose optical components are designed exclusively for the use of image-providing sensors for observation without an ocular viewing being provided. Also, a manual intervention for controlling the optical components is no longer necessary. This task is assumed by position motors which are connected to a control computer.

The microscope concept permits an optimization to the dimensions of the specimen geometry as well as to the geometry of different specimen carriers and to the image-providing sensor used.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
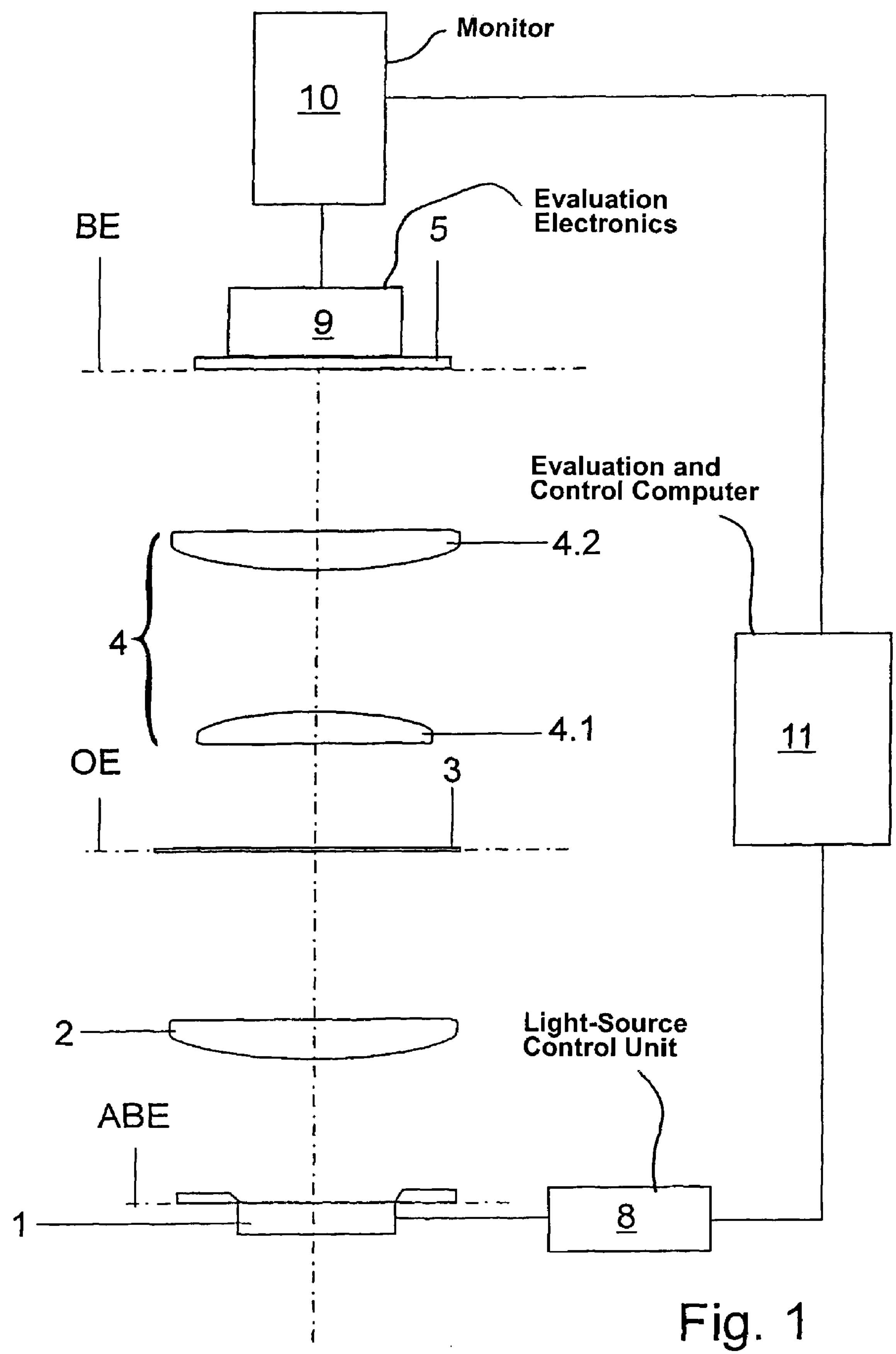
FIG. 1 shows an arrangement of optical components in the beam path of an automatic microscope.

According to the invention, the automatic microscope corresponding to FIG. 1 contains, as optical components, an illuminating field 1 as a light source which is positioned at or in the vicinity of the aperture diaphragm plane ABE of a condenser 2 downstream of the illuminating field 1. An object 3 to be examined can be arranged in an object plane OE. This object is imaged onto an image-providing sensor 5 via an imaging optic 4 comprising an imaging objective 4.1 and an image forming lens 4.2. The objective 4.1 images at infinity and the image-providing sensor 5 is mounted in the image plane BE of the imaging optic 4.

Figure 2:
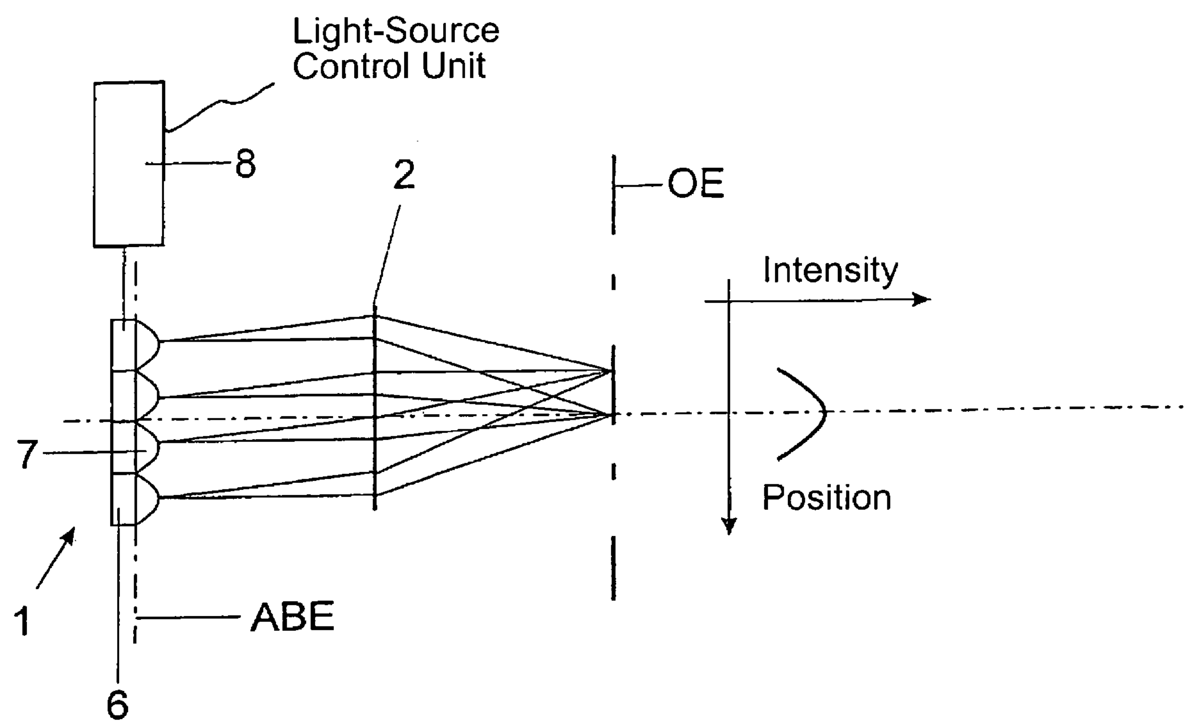
FIG. 2 shows a field illumination in the object plane with illumination provided by a two-dimensional LED-array as the illuminating device; and, FIG. 3 shows an image point being imaged onto sensor pixels of an image-providing sensor.

According to FIG. 2, the illuminating field 1 is composed of individual semiconductor components (LEDs) 6, which emit at different wavelengths, so that mixed colors are formed by the superposition of individual colors in the object plane OE. A microlens array 7 is provided to better adapt the already surface-configured illuminating field 1 to the specimen to be illuminated.

The adaptation of the illuminating field 1 to the object affords the advantage that a previously needed intense magnification of the illuminating source is not necessary. Furthermore, a reduction of chromatic aberration is associated with an illuminating source configured in this way.

The semiconductor components 6 are individually controllable in intensity by means of a light-source control 8 configured as a multi-channel LED-controller (one channel per color) whereby an adjustment of the brightness and/or of the color temperature of the illuminating field 1 can take place.

A simple condenser 2 is sufficient for the illumination notwithstanding the non-lambert emission characteristic of a two-dimensional LED-array.

The image-providing sensor 5 is connected via an evaluation electronic 9 to a monitor 10 for image display. An evaluation and control computer 11 functions for the component control (connections not shown) and assumes also the control of the illuminating field 1 via the light-source control 8.

Figure 3:
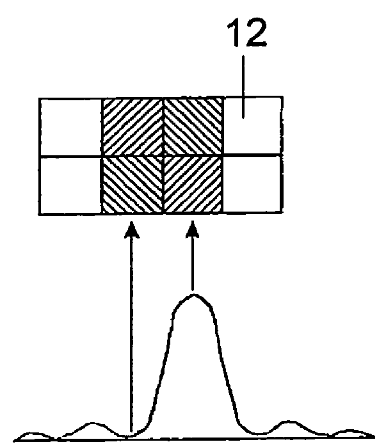

In contrast to microscopes, which are designed for an ocular object evaluation, the imaging optic 4 is matched to the use of the image-providing sensor 5. The aperture at the object end results from the structure in the specimen which is to be resolved. Field size and magnification are so adapted to the image-providing sensor 5 that each image point to be resolved is imaged on two×two sensor pixels 12 via the imaging optic 4 corresponding to FIG. 3.

The invention claimed is:

1. An automatic microscope for examining a specimen, the automatic microscope defining an optical axis and comprising:

an optical system including an illuminating field for illuminating the specimen;

said optical system further including a condenser mounted along said optical axis downstream of said illuminating field;

said condenser defining an aperture diaphragm plane;

said illuminating field being disposed at least approximately in said diaphragm plane;

said optical system further including an imaging optic mounted downstream of said condenser and defining an image plane;

an image-providing sensor mounted in said image plane;

an evaluation and control computer;

a light-source control unit for controlling at least one of the brightness and color temperature of said illuminating field;

said light-source control unit being connected to said evaluation and control computer;

said illuminating field comprising a plurality of individual semiconductor components emitting at respectively different wavelengths;

said light-source control unit functioning to drive said semiconductors individually or in groups of the same type thereby adjusting at least one of the brightness and color temperature of said illuminating field; and, a microlens array for adapting said illumination field to the specimen to be illuminated.

2. The automatic microscope of claim 1, said imaging optic having a field size and a magnification; and, said field size and said magnification being matched to said image-providing sensor to cause each image point to be resolved to be imaged via said imaging optic onto 2×2 sensor pixels of said image-providing sensor.

3. The automatic microscope of claim 1, further comprising a monitor for image display and an evaluating electronic unit; and, said image-providing sensor being connected via said evaluating electronic unit to said monitor for said image display.

4. The automatic microscope of claim 1, wherein said optical system defines an object plane and said specimen has a structure to be resolved and said image-providing sensor has an object-side aperture and said object-side aperture is determined by said structure of said specimen.

5. The automatic microscope of claim 1, wherein said microlens array is disposed in the region of said aperture diaphragm plane.

* * * * *